US012334664B2

(12) United States Patent
Lee et al.

(10) Patent No.: US 12,334,664 B2
(45) Date of Patent: Jun. 17, 2025

(54) BATTERY INTERFACE FOR AN ELECTRICAL DEVICE

(71) Applicant: TECHTRONIC CORDLESS GP, Anderson, SC (US)

(72) Inventors: Hei Man Lee, Kwai Chung (CN); Li Feng Wang, Dongguan (CN)

(73) Assignee: TECHTRONIC CORDLESS GP, Anderson, SC (US)

( * ) Notice: Subject to any disclaimer, the term of this patent is extended or adjusted under 35 U.S.C. 154(b) by 290 days.

(21) Appl. No.: 17/774,245

(22) PCT Filed: Nov. 5, 2019

(86) PCT No.: PCT/CN2019/115538
§ 371 (c)(1),
(2) Date: May 4, 2022

(87) PCT Pub. No.: WO2021/087719
PCT Pub. Date: May 14, 2021

(65) Prior Publication Data
US 2022/0352666 A1    Nov. 3, 2022

(51) Int. Cl.
*H01R 13/11* (2006.01)
*H01R 13/187* (2006.01)

(52) U.S. Cl.
CPC ......... *H01R 13/113* (2013.01); *H01R 13/187* (2013.01)

(58) Field of Classification Search
CPC .. H01R 13/113; H01R 13/187; H01R 13/052; H01R 13/111; H01R 13/17; H01R 13/20; A01D 34/78; Y02E 60/10
(Continued)

(56) References Cited

U.S. PATENT DOCUMENTS 5,474,479 A * 12/1995 Bennett ................ H01R 13/187
439/843
6,247,976 B1 * 6/2001 Chiu ................... H01R 13/113
439/857
(Continued)

FOREIGN PATENT DOCUMENTS

CN     1877916 A    12/2006
CN   102769220 A    11/2012
(Continued)

OTHER PUBLICATIONS

Chinese Office Action Corresponding to Application No. 201980100977 on Apr. 25, 2025.
(Continued)

*Primary Examiner* — Alexander Gilman
(74) *Attorney, Agent, or Firm* — Dority & Manning, P.A.

(57) ABSTRACT

An interface (30) between a battery and an electrical device, the interface (30) comprising: a male terminal (24) and a female terminal (26) configured to receive the male terminal (24); the female terminal (26) having a female contact (36) of conductive material and the male terminal (24) having a male contact (32) of conductive material; wherein, at least one of the female contact (36) and the male contact (32) are resiliently deformable such that insertion of the male terminal (24) in the female terminal (26) provides an area (40) of face to face contact in which the male contact (32) and the female contact (36) conform to each other.

22 Claims, 8 Drawing Sheets

(58) Field of Classification Search
USPC .......................................................... 439/852
See application file for complete search history.

(56) References Cited

U.S. PATENT DOCUMENTS

| | | | | |
|---|---|---|---|---|
| 6,254,439 | B1* | 7/2001 | Endo | H01R 13/187 |
| | | | | 439/846 |
| 6,354,849 | B1* | 3/2002 | Jones | H01R 12/585 |
| | | | | 439/82 |
| 7,387,548 | B2* | 6/2008 | Takehara | H01R 13/187 |
| | | | | 439/856 |
| 9,001,516 | B2* | 4/2015 | Nakayama | H05K 5/0082 |
| | | | | 475/116 |
| 9,484,644 | B2* | 11/2016 | Ohkubo | H01R 13/04 |
| 9,559,467 | B1* | 1/2017 | Khorrami | H01R 13/6581 |
| 9,680,247 | B1* | 6/2017 | Glick | B60L 53/16 |
| 9,893,441 | B2* | 2/2018 | Moriyasu | H01R 12/721 |
| 9,979,111 | B2* | 5/2018 | Yoshioka | H01R 13/111 |
| 10,050,366 | B2* | 8/2018 | Chevreau | H01R 13/53 |
| 10,347,996 | B2* | 7/2019 | Kung | B23K 1/20 |
| 10,454,196 | B2* | 10/2019 | Feng | F16F 1/045 |
| 10,879,656 | B2* | 12/2020 | Wang | H01R 24/62 |
| 11,349,243 | B2* | 5/2022 | Katz | H02K 5/161 |
| 11,824,284 | B2* | 11/2023 | Yamamoto | H01R 12/613 |
| 2005/0014422 | A1* | 1/2005 | Patel | H01R 13/114 |
| | | | | 439/851 |
| 2011/0293987 | A1* | 12/2011 | Tartaglia | H01M 50/543 |
| | | | | 429/121 |
| 2013/0280573 | A1* | 10/2013 | Taga | H01R 13/5216 |
| | | | | 429/100 |
| 2013/0323955 | A1* | 12/2013 | Nishio | H01R 12/732 |
| | | | | 439/325 |
| 2014/0302353 | A1* | 10/2014 | Ogura | H01M 50/572 |
| | | | | 429/7 |
| 2014/0302376 | A1* | 10/2014 | Naito | H01M 50/213 |
| | | | | 429/156 |
| 2014/0302377 | A1* | 10/2014 | Naito | H01M 50/213 |
| | | | | 429/156 |
| 2015/0349375 | A1* | 12/2015 | Takahashi | H01M 10/0436 |
| 2016/0134044 | A1* | 5/2016 | Hirakawa | H01R 13/187 |
| | | | | 439/816 |
| 2022/0352666 | A1* | 11/2022 | Lee | H01R 13/113 |

FOREIGN PATENT DOCUMENTS

| | | |
|---|---|---|
| CN | 103259115 A | 8/2013 |
| CN | 103403973 A | 11/2013 |
| CN | 104064898 A | 9/2014 |
| CN | 206850065 U | 1/2018 |
| CN | 108110470 A | 6/2018 |

OTHER PUBLICATIONS

European Search Report Corresponding with Application No. EP19951803 on Jun. 15, 2023 (2 pages).
International Search Report corresponding with Application No. PCT/CN2019/115538 on Jul. 13, 2020 (2 pages).

* cited by examiner

Figure 1A

Prior Art

Figure 1B

Prior Art

Figure 8

BATTERY INTERFACE FOR AN ELECTRICAL DEVICE

PRIORITY CLAIM

This application is a National Stage Patent Application of PCT/CN2019/115538, filed on Nov. 5, 2019, the disclosure of which is incorporated by reference herein in its entirety.

FIELD OF THE INVENTION

The invention relates battery powered devices and in particular, the electrical interface between the battery and the device.

BACKGROUND

With the development of battery technology, many devices that were traditionally powered by 'mains' electrical power, or a small internal combustion engine, are now battery powered. For convenience, the batteries are normally configured for quick removal and replacement with a recharged battery to extend the operating time of the device. This is usually achieved via a battery interface that has male terminals that plug into female terminals to establish an electrical connection.

Figure 1A:
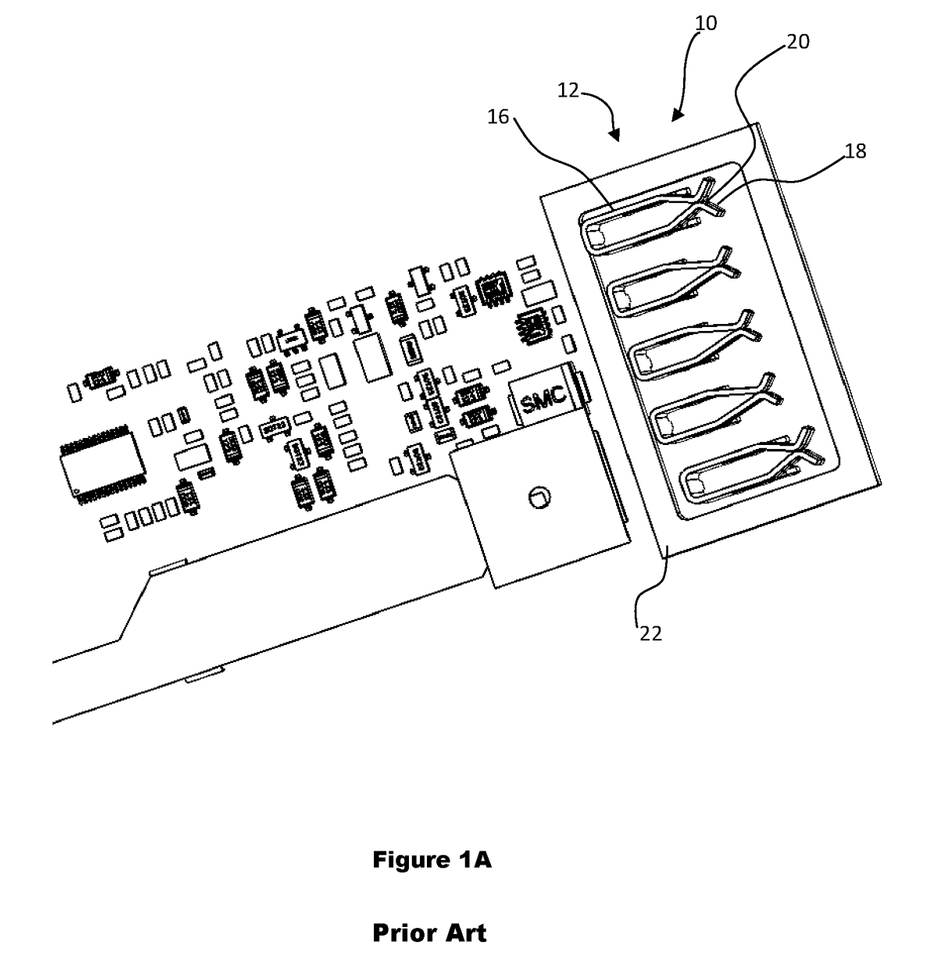
FIGS. 1A and 1B show an interface between a battery and an electrical device according to the prior art.
Figure 1B:
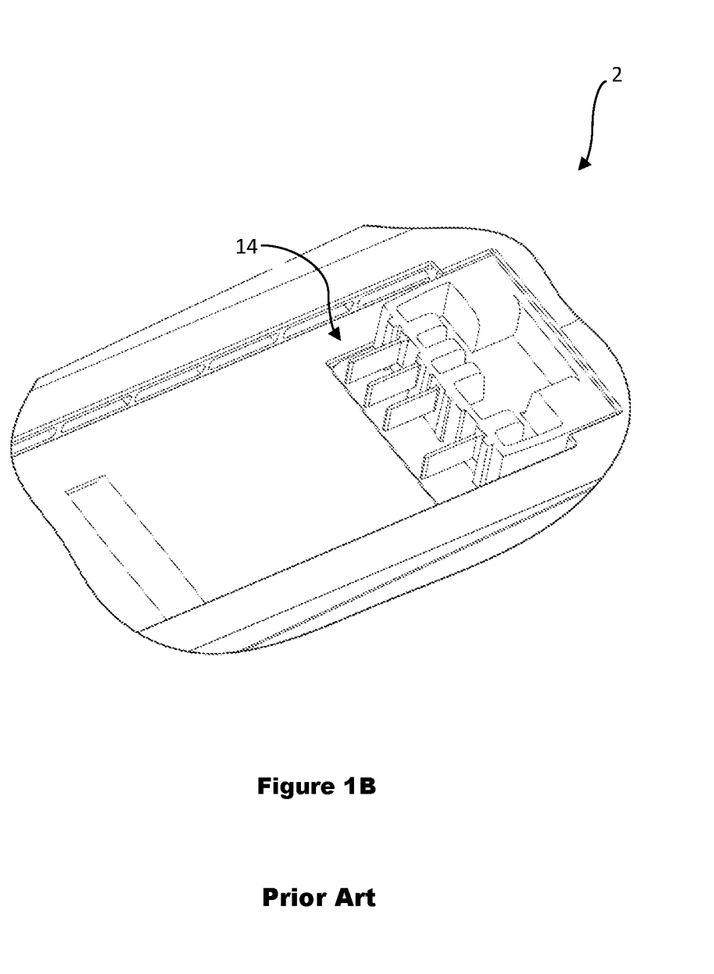

To ensure the electrical connection is maintained during use, the male terminals plug into the female terminals with an interference fit. FIGS. 1A and 1B depict a prior art battery interface of this type. FIG. 1A shows the female side 10 of the interface for receiving the male side 2 shown in FIG. 1B. The female side 10 has casing 22 housing a series of adjacent female contacts 12, each having a pair of opposed conductive arms 16 and 18 biased towards each other so they contact at the bend line 20. The male side 2 has a series of male contacts 14 in the form of flat spade terminals. The outer surfaces if the opposed arms 16 and 18 of the corresponding female contacts 12 guide the male contacts 14 to the bend line 20. Here the force of insertion wedges the arms 16 and 18 apart as the male contacts 14 slide between to fully engage the female contacts 12.

The inward bias on the arms 16 and 18 clamp the male terminals 14 to ensure the electrical connection is maintained. However, the area of physical contact between the terminal and the contacts is solely along their respective bend lines 20. This is a relatively small surface area and may cause high electrical resistance, particularly if the circuit carries a high current. In some circumstances, the interface between a plug-in battery and a DC motor carries a relatively high current and therefore the resistive losses at the electrical interface are significant.

With these issues in mind it would be beneficial to provide an interface between a battery and an electrical device in which the male and female terminals that have relatively low resistive losses.

SUMMARY OF THE INVENTION

Disclosed herein is an interface between a battery and an electrical device, the interface comprising: a male terminal and a female terminal configured to receive the male terminal; the female terminal having a female contact of conductive material and the male terminal having a male contact of conductive material; wherein, at least one of the female contact and the male contact are resiliently deformable such that insertion of the male terminal in the female terminal provides an area of face to face contact in which the male contact and the female contact conform to each other.

In another aspect, there is disclosed an electrical device with an interface to a battery, the interface comprising: a male terminal and a female terminal configured to receive the male terminal; the female terminal having a female contact of conductive material and the male terminal having a male contact of conductive material; wherein, at least one of the female contact and the male contact are resiliently deformable such that insertion of the male terminal in the female terminal provides an area of face to face contact in which the male contact and the female contact conform to each other.

Preferably, the female terminal has a recess for receiving the male terminal, and the female contact has resiliently deformable portions on at least two opposing sides of the recess.

Preferably, the male terminal has a casing with an opening through which the male contact extends, the male contact mounted in the casing for movement within the opening. Preferably, the opening is planar and the movement is a direction parallel to the plane of the opening. In a further preferred form, the male contact is fixed in a direction normal to the plane of the opening.

In optional embodiments, the male contact is resiliently deformable.

Preferably, the resiliently deformable portions of the female contact bow inwardly into the recess prior to insertion of the male terminal. Preferably, the male contact of the male terminal is cylindrical. Optionally, the male contact has a rectangular cross section and opposing flat surfaces to provide the area of face to face contact with the female contact. Optionally, the male contact has concave portions to provide the area of face to face contact with the female contact.

Preferably, the female contact is provided by resiliently deformable strips compressively held within the recess such that the strips bow inwardly.

Preferably, the strips are elongate and extend in a direction of insertion and withdrawal of the male terminal.

Preferably, the strips extend from an integrally formed transverse member, such that the strips are spaced along an edge of the transverse member to form a comb structure. Optionally, the resiliently deformable strips extend between two spaced apart transverse members to form a ladder structure.

Preferably, the recess has two of the comb structures, such that the transverse member of each of the comb structures are spaced apart and the strips from each of the comb structures are interleaved with each other.

Preferably, the transverse member of the comb structure is shaped such that the strips are positioned circumferentially around the male terminal.

Preferably, the transverse member is formed into an enclosed ring such that the strips bow radially inwards and the male contact has a circular cross section smaller than the internal diameter of the ring.

Preferably, the male contact of the male terminal is cylindrical, or optionally hourglass shaped.

Preferably, the strips are formed of copper, silver or a conductive alloy.

Preferably, during use, an electrical current flow between the battery and the device, is between 40 amps to 400 amps. In a further preferred form, the electrical current flow between the battery and the device, is between 80 amps to 300 amps, or more preferably, 100 amps to 150 amps.

Preferably, the male contact has a cross section transverse to the direction of insertion with a minimum dimension between 3 mm to 20 mm. In a further preferred form, the male contact has a cross section transverse to the direction of insertion with a minimum dimension between 8 mm to 12 mm.

Preferably, the insertion force of the male terminal into the female terminal is between 5 Newtons to 50 Newtons. In a further preferred form, the insertion force of the male terminal into the female terminal is between 15 Newtons to 30 Newtons.

Preferably, the removal force to disengage the male terminal and the female terminal is between 2 Newtons to 30 Newtons. In a further preferred form, the removal force to disengage the male terminal and the female terminal is between 12 Newtons to 20 Newtons.

In a particularly preferred form, the battery includes the female terminal.

In some embodiments, the interface further comprises a spade or pin type male contact and matching female contact for transmitting an electrical data signal. In a particularly preferred form, the data signal is indicative of one or more of the following:
 battery charge level,
 battery temperature, and
 remaining operating time.

BRIEF DESCRIPTION OF THE DRAWINGS

Preferred embodiments of the present invention will now be described by way of example only, with reference to the accompanying drawings, in which.

DETAILED DESCRIPTION OF THE PREFERRED EMBODIMENTS

FIGS. 1A and 1B show a female terminal 10 and a male terminal 2 according to a prior art battery interface. The terminal body 22 provides a series of female contacts 12 for receiving the male contacts 14. Each of the female contacts 12 have opposed arms 16 and 18 biased against each other so that they abut at a bend line 20 extending the width of the arms 16 and 18.

The male contacts 14 are simple spade terminals in which the flat spade contact wedges the arms 16 and 18 apart when inserted into the female contacts 12. The electrical connection between the male contacts 14 and the female contacts 12 is only along the bend lines 20. These "lines" of contact provide very little surface area connection between the two contacts. The small area of connection can cause electrical resistance particularly when the electrical interface is in a circuit for a relatively high current. For example, batteries powering a DC motor for a large device such as a lawn mower will require a relatively high current (e.g. more than 40 amps) in which case, the electrical resistance caused by the thin lines of contact 20 between the male and female terminal 2 and 10 is detrimental to the overall efficiency of the device. This in turn reduces the operating time before the battery needs replacement or recharging.

For devices such as leaf blowers, stick vacuums and so on the normal "run time" should be long enough to allow the user to complete a routine or typical task before needing to recharge the battery. Similarly, the battery should not be overly large to ensure that the handheld device is not impractically heavy during use.

Figure 2A:
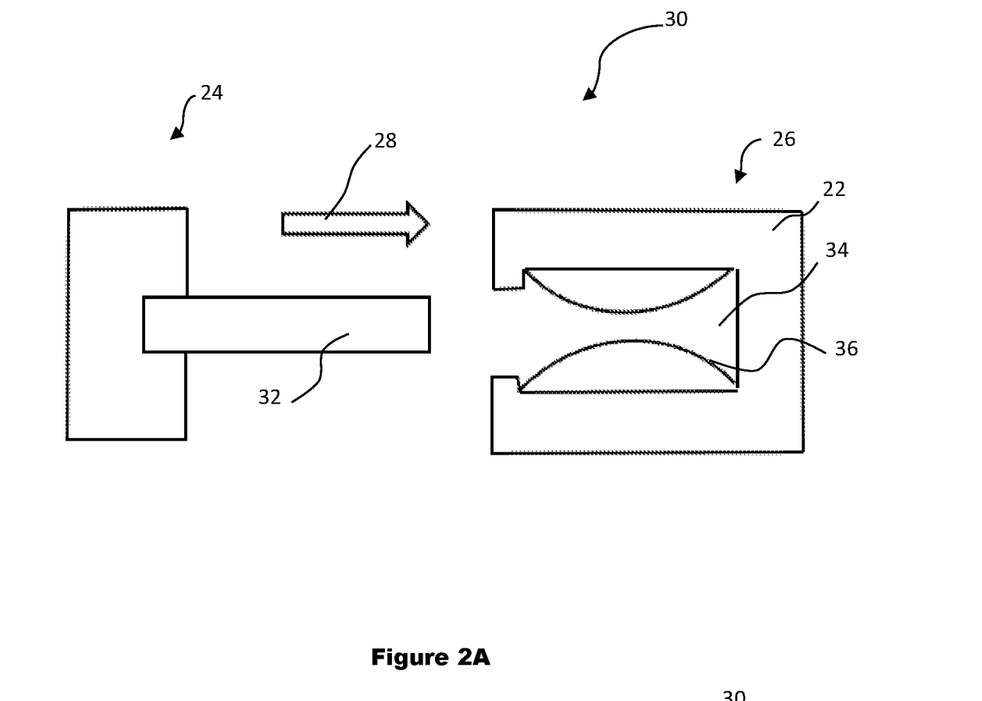
FIG. 2A shows a schematic depiction of an electrical connection according to the present invention prior to insertion of the male terminal into the female terminal.
Figure 2B:
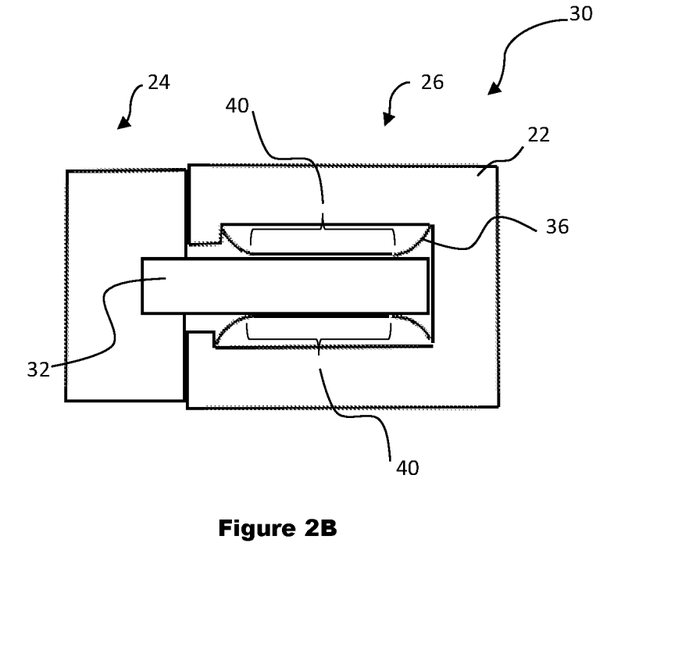
FIG. 2B shows the electrical connection of FIG. 2A with the male terminal.

With these issues in mind there is an ongoing imperative to minimise the electrical losses at the electrical interface between a plug-in battery and an electrically driven device. As shown in FIGS. 2A and 2B, an electrical interface in accordance with the present invention is schematically shown in the interests of clarity. Referring to FIG. 2A, the electrical interface 30 is shown with the male terminal 24 disengaged from the female terminal 26. The male terminal 24 has a male contact 32 for insertion in a recess 34 formed a female terminal 22. Within the recess 34, is the female contact 36 which provides a conductive surface that bows inwardly. The female contact 36 is configured to be resiliently deformable such that placing the male contact 32 into the recess 34 along the direction of insertion 28 deforms the female contact 36 as shown in FIG. 2B. To accommodate the male contact 32, the female contact 36 conforms to its exterior to provide at least one area 40 of face to face contact. This face to face contact area 40 provides a much lower electrical resistance to current flow, and in particular high current flow. At the same time, the elastic deformation of the female contact 36 grips the male contact 32 to retain the male terminal 24 and female terminal 26 in engagement.

Figure 4:
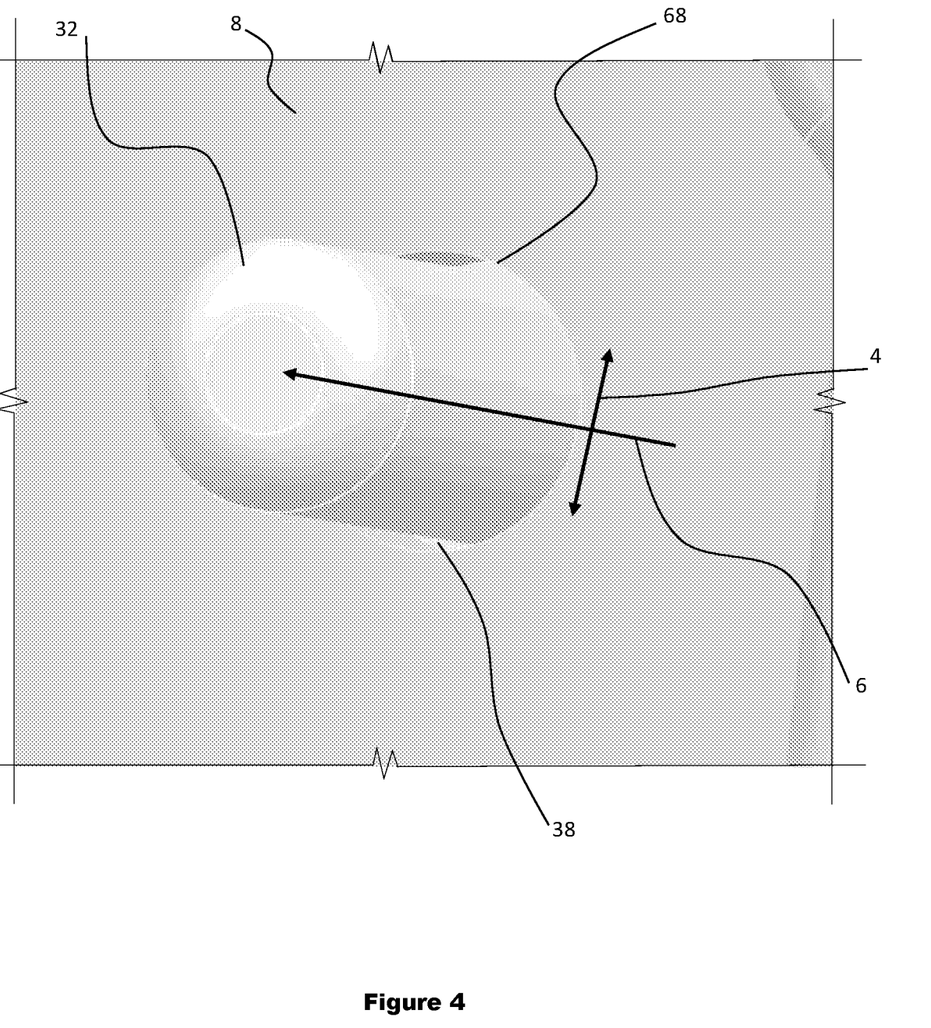
FIG. 4 is perspective of a male terminal with a male contact extending through an opening in its exterior casing.

As shown in FIG. 4, the distal end of the male contact 32 has rounded or chamfered edges to assist insertion into the female contact 36. The casing 8 of the male terminal 24 has an opening 68 through which the male contact 32 extends. The opening 68 is larger than the male contact 32 to provide a peripheral gap 38. The male contact 32 is mounted in the casing 8 so that it can move within the opening 68. More specifically, the male contact 32 has limited movement on a direction parallel to the plane of the opening 68 (see for example arrow 4), but remains fixed in a direction 6 normal to the plane. This configuration compensates for manufacturing and/or installation errors of the male contact 32 relative to its casing 8. It assists the male contact 32 to be centered with the female contact 36.

Figure 3A:
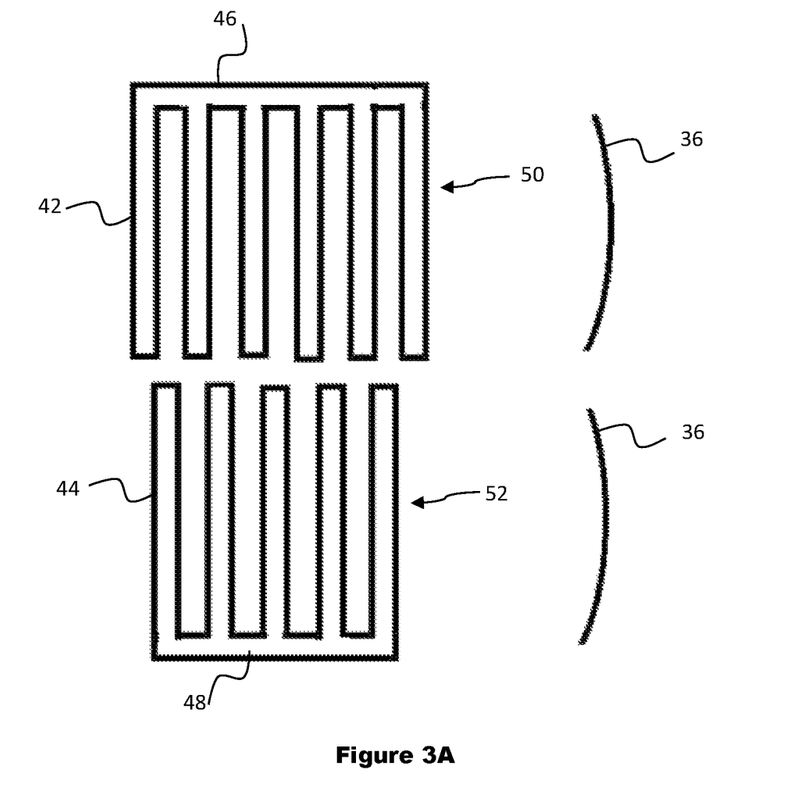
FIG. 3A shows a schematic front and side views of two mutually opposed conductive comb structures to be interleaved together and compressively held in the recess of a female terminal.
Figure 3B:
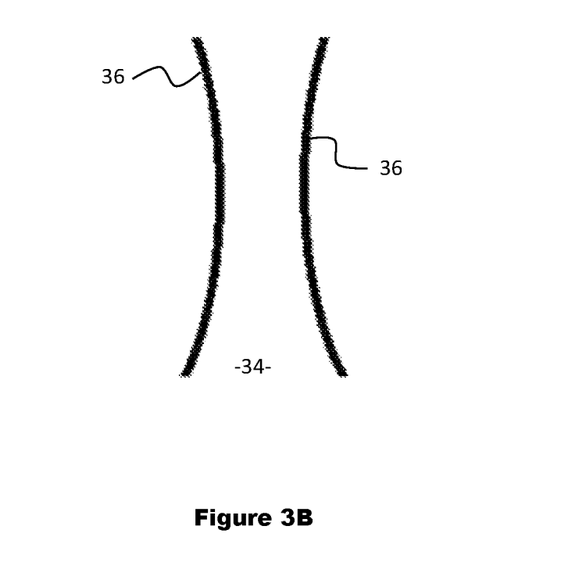
FIG. 3B schematically illustrates the mutually opposed strips of the comb structures bowing inwardly within the recess.
Figure 5A:
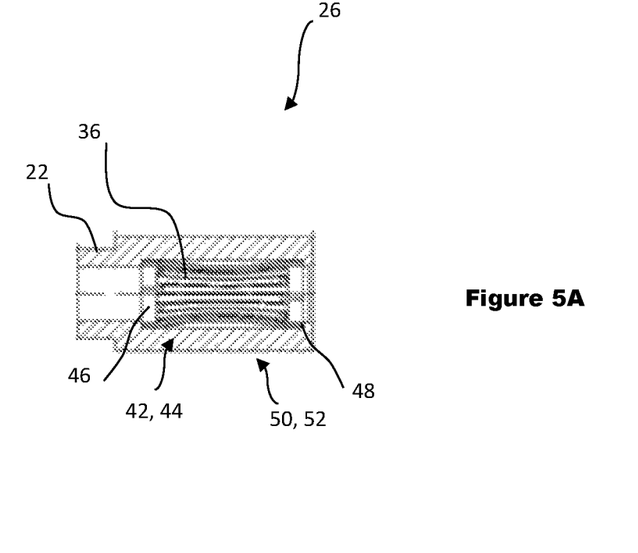
FIGS. 5A and 5B are partial section views of the female and male terminals respectively.
Figure 5B:
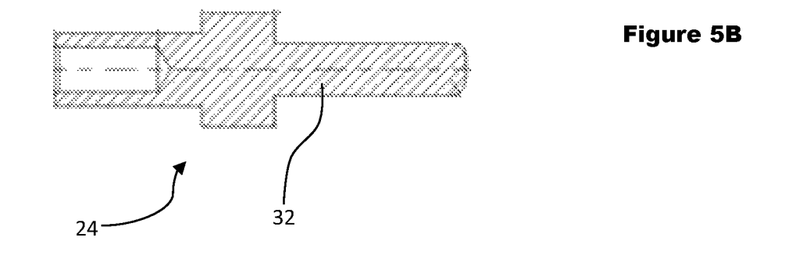

FIGS. 3A and 3B schematically illustrate a convenient technique for providing the bowed female contacts 36. The female contact 36 is provided by conductive material formed into two mutually opposed comb structures 50 and 52. Each comb structure has a cross member 46 and 48 from which conductive strips 42 and 44 extend respectively. The comb structures 50 and 52 are brought together such that their conductive strips 42 and 44 are interleaved. As best shown in FIGS. 5A and 5B, both comb structures 50 and 52 are then rolled such that the cross members 46 and 48 form an enclosed shape such as a circle. The combined comb structures 50 and 52 are compressively held within the recess 34 such that the individual conductive strips 42 and 44 bow inwardly as shown in FIG. 3B and FIG. 5A. The lengthwise direction of each of the conductive strips 42 and 44 generally aligns with the direction of insertion 28 (see FIG. 2A) so as not to present any edges or structural barriers that would hamper the insertion of the male contact 32.

The bowed female contact may be formed in other ways. For example, it can be provided as a single, integrally formed comb structure, or a ladder structure with transverse elements extending along both sides of the adjacent strips. It may also be provided by multiple pieces of cooperating elements, or any other structures providing suitable resilience.

As shown in FIG. 5, another embodiment of the electrical connection 54 is shown. In this embodiment, the male terminal 24 has a male contact 58 that provides resiliently deformable strips 60 about its exterior. The female terminal 26 has a casing 22 defining a socket 34 similar to the previous embodiment. However, the female contact 56 is simply a conductive sleeve and not resiliently deformable.

Insertion of the male contact 58 into the socket 34 in the direction of insertion 28 compresses the resiliently deformable strips 60 such that they conform to the internal surface of the female contact 56 to provide the face to face contact area 40 (not shown).

Figure 6:
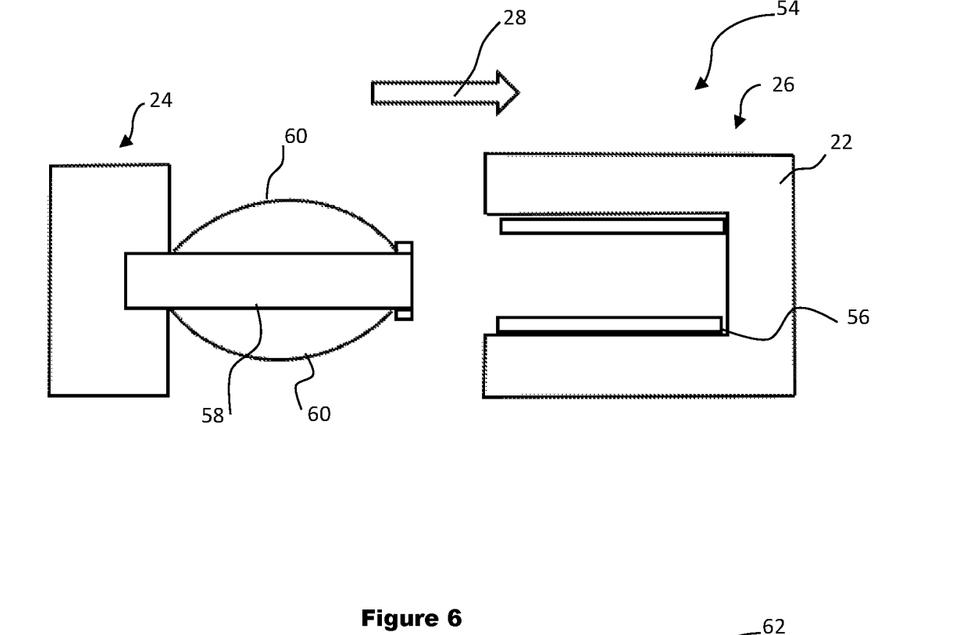
FIG. 6 schematically depicts an embodiment of a male terminal with resiliently deformable male contact.
Figure 7:
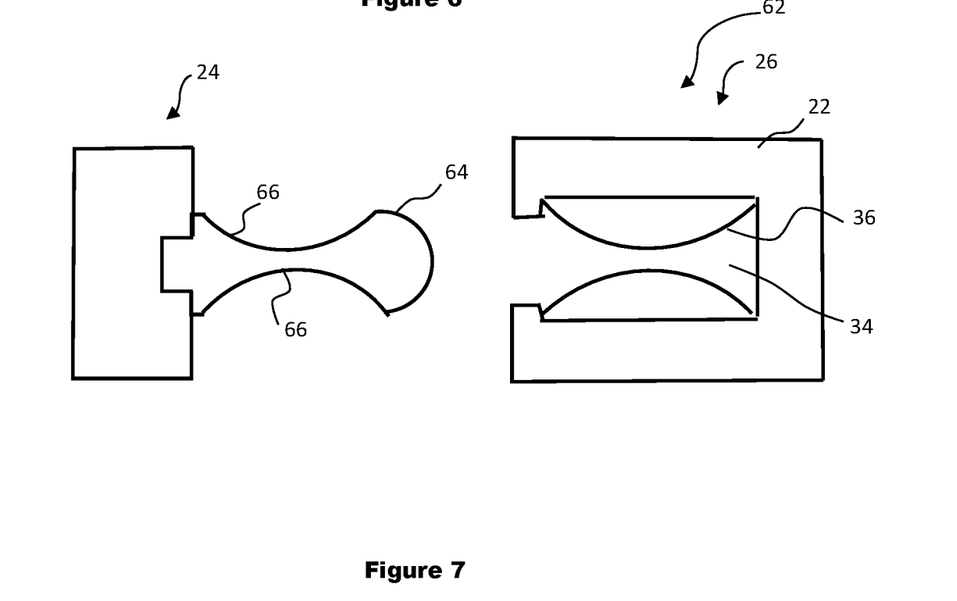
FIG. 7 schematically depicts an embodiment of the male contact with an exterior surface profiled to nest with the female contact.

FIG. 6 schematically illustrates another embodiment of the electrical interface 62 in which the female terminal 26 is structurally similar to that of the first embodiment of the electrical connection 30. However, the male terminal 24 has male contacts 64 with exterior surfaces shaped to generally conform with the internal surface of the female contact 36. Providing an hourglass shaped exterior surface 66 on the male contact 64 promotes a large face to face contact area 40 (not shown) where the male contact 64 and the female contact 36 are biased into mutually nested abutting engagement. This provides a connection with low electrical resistance as well as stronger physical retention of the male terminal 24 in the female terminal 26.

Embodiments of the electrical connection may have additional male contacts in the form of flat spade terminals or circular cross-section pins for transmitting data indicative of an operating status or parameter of the device or battery. For example, the data may be indicative of the current battery charge level, the battery temperature, the device temperature and/or the remaining operating time.

Figure 8:
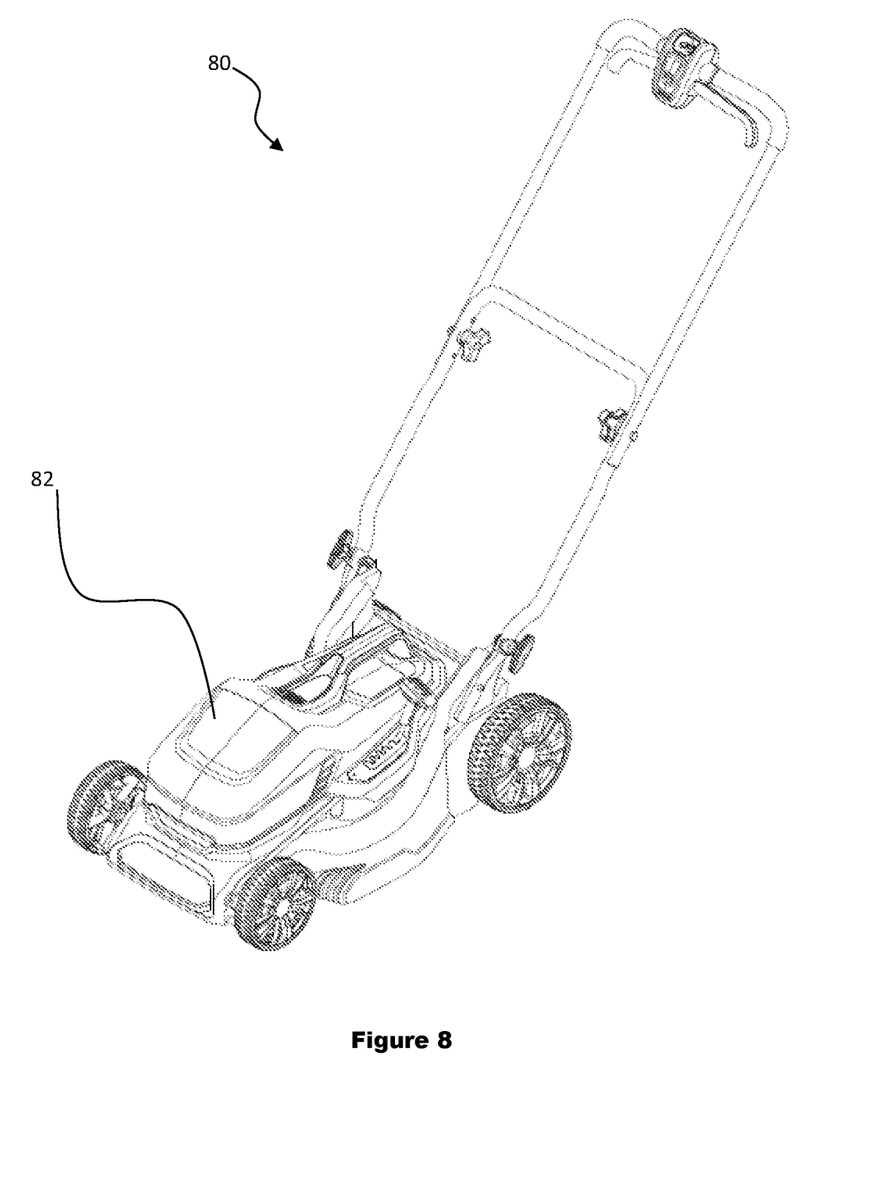
FIG. 8 is a perspective of a battery power lawn mower using a battery interface according to the invention.

The electrical interfaces described herein are well suited for use at the connection between a plug-in rechargeable battery and the DC motor of a device that draws a relatively high current such as a battery powered lawn mower. FIG. 8 shows a battery powered lawn mower 80 with one or more rechargeable batteries in a battery compartment 82, however the battery interface is also suited to devices such as a handheld leaf blower, stick vacuum, line trimmer, hedge trimmer and so on. For these devices it can be advantageous to provide the female terminals on the battery for less risk of water contact (if caught during a rain shower etc.). The device may have more than battery. The battery may be a nickel cadmium battery, nickel metal hydride battery, lithium ion battery or sealed lead acid battery. For devices of this type, the rechargeable batteries are configured to provide an output, but also receive an input recharge current in the range of 40 amps to 400 amps, or preferably between 80 amps to 300 amps, or more preferably, 100 amps to 150 amps.

Structurally, the Applicant's development of these products has shown that the minimum dimension of the cross section of the male contact transverse to the direction of insertion 28 should be in the range of 3 mm to 20 mm, or preferably the male contact has a cross section transverse to the direction of insertion with a minimum dimension between 8 mm to 12 mm.

For example, if the male contact is a cylindrical pin such as that shown in FIG. 4, the diameter of the pin should be between 3 mm and 20 mm. Likewise, a practical range for the insertion force of the male terminal into the female terminal should be in the range of 5 Newtons to 50 Newtons, or preferably the insertion force of the male terminal into the female terminal is between 15 Newtons to 30 Newtons. These insertion forces used with contacts having the dimensions in the ranges discussed above provide suitably low contact resistance.

When removing the male terminal from the female terminal, the extraction force should be in the range of 2 Newtons to 30 Newtons such that the battery is retained on the device during normal operation but not impractical for a user to manually remove, or preferably between 12 Newtons to 20 Newtons.

As the sophistication of the devices described above improves, there is an increasing call for a data communication terminal at the electrical interface in addition to the high current male and female terminals. The data terminal may transmit a signal indicative of battery charge levels, battery temperature, device temperature, remaining operating time or other information to a user display on the device. The data terminal may be provided by a conventional blade or pin terminal and socket given the current levels are far lower and electrical resistance is not a significant issue.

The present invention has been described herein by way of example only. Skilled workers in this field will readily appreciate and recognize many variations and modifications which do not depart from the spirit and scope of the broad inventive concept.

The invention claimed is:

1. An interface between a battery and an electrical device, the interface comprising:
   a male terminal; and,
   a female terminal configured to receive the male terminal, the female terminal having a female contact of conductive material and the male terminal having a male contact of conductive material; wherein,
   at least one of the female contact and the male contact are resiliently deformable such that insertion of the male terminal in the female terminal provides an area of face to face contact in which the male contact and the female contact conform to each other,
   the female terminal has a recess for receiving the male terminal, and the female contact has resiliently deformable portions on at least two opposing sides of the recess,
   a plurality of resiliently deformable strips extend from an integrally formed transverse member, such that the strips are spaced along an edge of the transverse member to form a comb structure, and
   the recess has two of the comb structures, such that the transverse member of each of the comb structures are spaced apart and the strips from each of the comb structures are interleaved with each other.

2. An interface between a battery and an electrical device according to claim 1 wherein, the male terminal has a casing with an opening through which the male contact extends, the male contact mounted in the casing for movement within the opening.

3. An interface between a battery and an electrical device according to claim 1 wherein the male contact of the male terminal is cylindrical.

4. An interface between a battery and an electrical device according to claim 1 wherein, during use, an electrical current flow between the battery and the device, is between 40 amps to 400 amps.

5. An interface between a battery and an electrical device according claim 1 wherein, the male contact has a cross section transverse to the direction of insertion with a minimum dimension between 3 mm to 20 mm.

6. An interface between a battery and an electrical device according to claim 1 wherein, the insertion force of the male terminal into the female terminal is between 5 Newtons to 50 Newtons.

7. An interface between a battery and an electrical device according to claim 1 wherein the removal force to disengage the male terminal and the female terminal is between 2 Newtons to 30 Newtons.

8. An interface between a battery and an electrical device according to claim 1 wherein the battery includes the female terminal.

9. An interface between a battery and an electrical device according to claim 1, further comprising a spade or pin type male contact and matching female contact for transmitting an electrical data signal.

10. An interface between a battery and an electrical device according to claim 9 wherein the data signal is indicative of one or more of the following:
    battery charge level,
    battery temperature, and
    remaining operating time.

11. An electrical device with a battery interface according to claim 1.

12. An interface between a battery and an electrical device according to claim 2 wherein, the opening is planar and the movement is a direction parallel to the plane of the opening.

13. An interface between a battery and an electrical device according to claim 12 wherein the male contact is fixed in a direction normal to the plane of the opening.

14. An interface between a battery and an electrical device according to claim 1 wherein the resiliently deformable portions of the female contact bow inwardly into the recess prior to insertion of the male terminal.

15. An interface between a battery and an electrical device according to claim 14 wherein the female contact is provided by the resiliently deformable strips compressively held within the recess such that the strips bow inwardly.

16. An interface between a battery and an electrical device according to claim 15 wherein, the strips include copper, silver or a conductive alloy.

17. An interface between a battery and an electrical device according to claim 15 wherein, the strips are elongate and extend in a direction of insertion and withdrawal of the male terminal.

18. An interface between a battery and an electrical device according to claim 17 wherein the resiliently deformable strips extend between two spaced apart transverse members to form a ladder structure.

19. An interface between a battery and an electrical device according to claim 17 wherein, the transverse member of the comb structure is shaped such that the strips are positioned circumferentially around the male terminal.

20. An interface between a battery and an electrical device according to claim 19 wherein, the transverse member is formed into an enclosed ring such that the strips bow radially inwards and the male contact has a circular cross section smaller than the internal diameter of the ring.

21. An interface between a battery and an electrical device according to claim 20 wherein, the male contact of the male terminal is cylindrical.

22. An interface between a battery and an electrical device, the interface comprising:
    a male terminal; and,
    a female terminal configured to receive the male terminal, the female terminal having a female contact of conductive material and the male terminal having a male contact of conductive material; wherein,
    at least one of the female contact and the male contact are resiliently deformable such that insertion of the male terminal in the female terminal provides an area of face to face contact in which the male contact and the female contact conform to each other,
    the female terminal has a recess for receiving the male terminal, and the female contact has resiliently deformable portions on at least two opposing sides of the recess,
    a plurality of resiliently deformable strips extend from an integrally formed transverse member, such that the strips are spaced along an edge of the transverse member to form a comb structure,
    the resiliently deformable portions of the female contact are held compressively at opposite transverse ends of each female contact prior and subsequent to insertion of the male terminal, thereby bowing each female contact inwardly into the recess prior to insertion of the male terminal, and
    the recess has two of the comb structures, such that the transverse member of each of the comb structures are spaced apart.

* * * * *